Patented Oct. 1, 1929

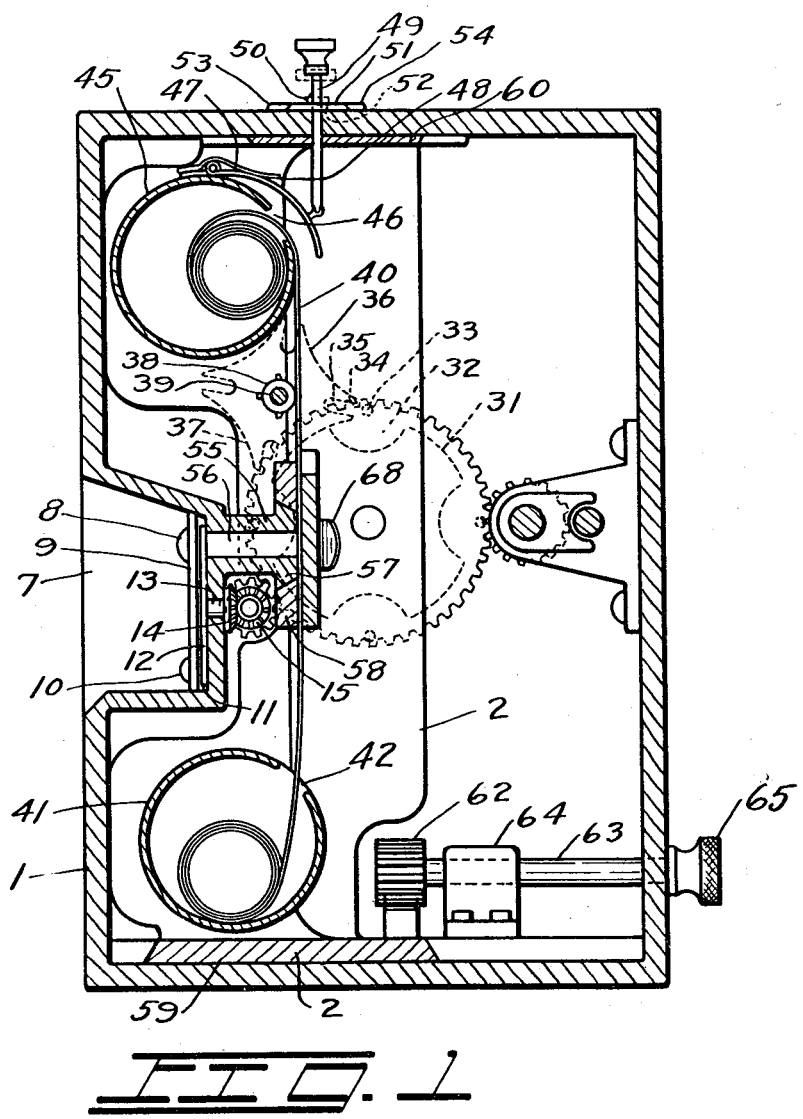

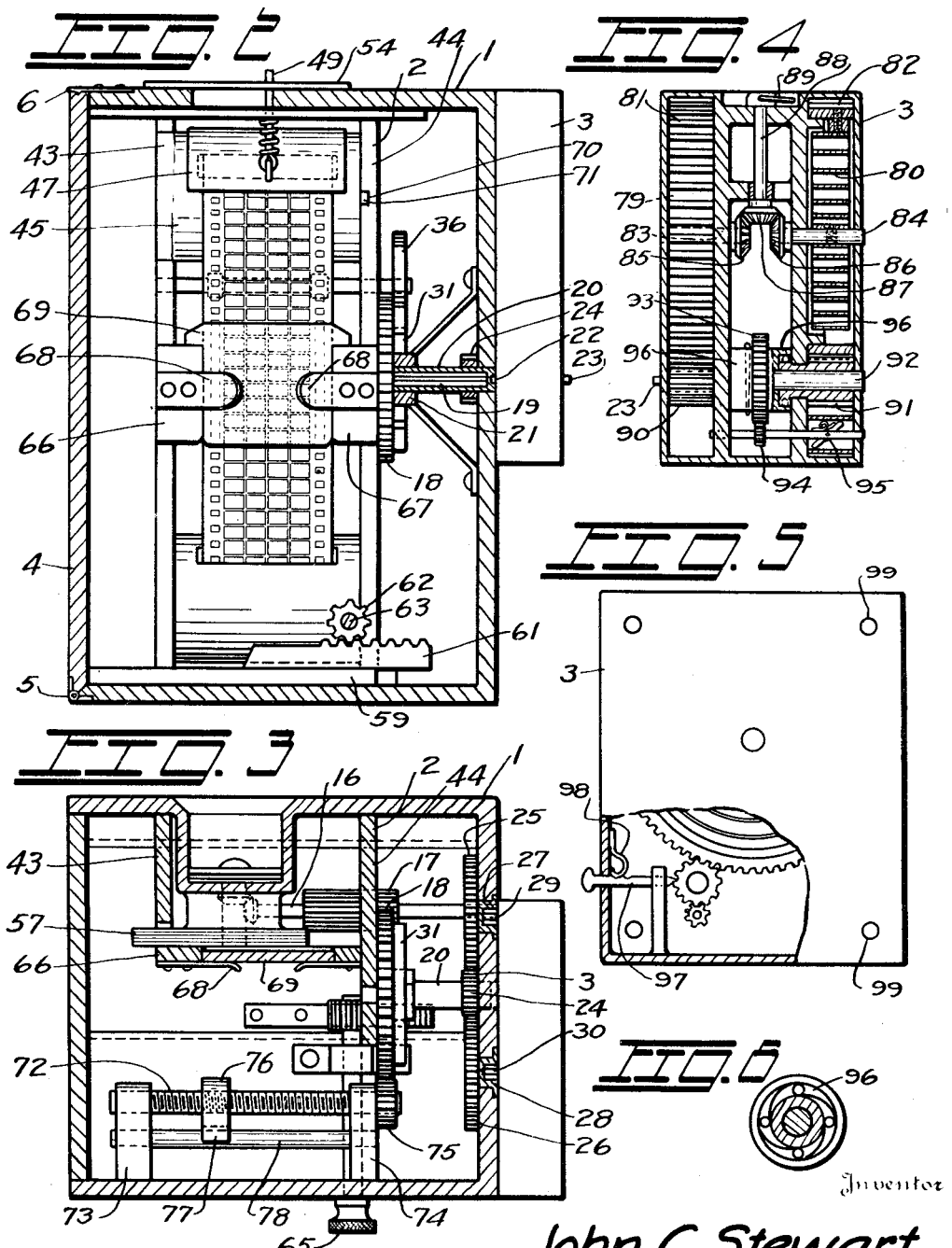

1,730,045

UNITED STATES PATENT OFFICE

JOHN C. STEWART, OF SEATTLE, WASHINGTON

PLURAL-ROW MOTION-PICTURE CAMERA

Application filed May 25, 1926. Serial No. 111,510.

The invention is a miniature moving picture camera utilizing short lengths of film and moving the film in relation to the lens to permit the taking of four rows of pictures thereon.

The object of the invention is to provide a motion picture camera with means for taking four consecutive rows of pictures on the standard size film.

Another object of the invention is to provide means for moving a film transversely of the lens of a camera.

Another object of the invention is to provide a simple and efficient means for operating the film of a motion picture camera.

A still further object of the invention is to provide a motion picture camera in which the film is adaptable to be moved in both directions.

And a still further object of the invention is to provide movable film holding devices which will permit the film to be readily removed from the camera.

With these ends in view the invention embodies a casing, a lens in the said casing, a slidable frame in the said casing, film containers in the said frame, means for moving the said frame, means for moving a film from one to the other of the said containers, a shutter, means for operating the said shutter, and means for operating the said film and shutter operating means.

Other features and advantages of the invention will appear from the following description taken in connection with the drawings, wherein:—

Figure 1 is a vertical cross section on a plane which is approximately the center line of the lens.

Figure 2 is also a vertical cross section taken at right angles to Figure 1 and through the rear portion of the casing.

Figure 3 is a sectional plan on a plane which approximately passes through the center line of the lens.

Figure 4 is a vertical section through the spring motor casing.

Figure 5 is a side elevation of the spring motor casing with part broken away.

Figure 6 is a detail showing one of the spring clutches.

In the drawings the device is shown as it would be made wherein numeral 1 indicates the casing, numeral 2 the slidable frame and numeral 3 the spring motor.

The casing 1 is made of a rectangular shape as shown with one side 4 hinged at the point 5 and held by a spring snap 6, as shown in Figure 2. At the front of the casing is a recessed portion 7 in which a lens 8 is held in a frame 9. The frame 9 may be held by screws 10 and may be provided with an opening 11 in which a shutter 12 operates. The shutter 12 is mounted upon a shaft 13 having a bevel gear 14 at the inner end that meshs with another bevel gear 15 on a shaft 16. The shaft 16 is provided with a circular gear rack 17 that meshes with a gear 18 on a splined shaft 19. The splined shaft 19 is slidable in a similar splined tubular shaft 20 which is held in a bearing 21 at one end and in the casing at the opposite end, and provided with a notch 22 at the opposite end to receive a projecting lug 23 on a spring motor casing. The shaft 20 is also provided with a gear 24 which meshes with other gears 25 and 26 as shown in Figure 3. The gears 25 and 26 are mounted on sockets 27 and 28 which are journaled in the side of the casing and provided with splined openings 29 and 30 in which keys may be inserted to rotate them. It will be observed that by rotating the device through the gears 25 and 26 it will be possible to rotate either of the gears in a clockwise direction and at the same time reverse the direction of the device by changing from one gear to the other.

On the gear 18 is a drum 31, as shown in Figure 1, which is provided with recesses 32 and pins 33 that receive and engage points 34 having slots 35 in them on a spider 36. The outer surfaces 37 of the spider are curved to engage the outer surface of the drum 31, and it will be observed that as the drum is rotated the pins 33 will engage the slots 35 and cause the spider to rotate at regular intervals, thereby providing the intermittent motion for the film, which is operated by the sprockets 38 on a shaft 39 upon which the spider 36 is also mounted.

The film, which is indicated by the numeral 40, rolls upon itself from its natural curl and the roll at the lower end is held in a circular container 41 having an opening 42 in it and held between vertical partitions 43 and 44 which form the side members of the frame 2, and the roll in the upper end is held in a similar container 45 which is removably held between the partitions. This container is also provided with an opening 46 and a cover 47, which is normally held against the container by a spring 48 and held away from the container while in use by a pin 49 having a lug 50 on it, as shown in Figure 1. It will be observed that the pin 49 is held in a sliding member 51 and the opening through which the pin passes has a notch 52 in it to permit the lug 50 to pass through so that by turning the pin slightly in either direction the lug 50 will bear on top of the plate and hold the pin and cover in the position shown. The upper part of the casing is provided with plates 53 and 54 having beveled inner surfaces to slidably hold the plate 51.

At the upper part of the rear of the recess 7 of the casing 1 is an extension 55 having an opening 56 therein which is directly behind the lens 8 and extends from the lens to the film, as shown in Figure 1. At the inner end of the extension 55 is a bar 57 having beveled edges as shown, which engage similar surfaces in a bar 58 which is mounted between the partitions 43 and 44 of the frame 2.

The frame 2 is made with the vertical partitions 43 and 44 as hereinbefore described, and these are held upon a plate 59 at the bottom and another plate 60 at the top. Each of these plates are provided with beveled edges and engage similar beveled surfaces of other plates on the casing to provide a slidable track for the frame at both the upper and lower ends. The plate 59 is provided with a gear rack 61 which meshes with a pinion 62 on a shaft 63 which is held in a bearing 64, as shown in Figure 1. At the outer end of the shaft 63 is a knob 65 by which it may be rotated to shift the position of the frame.

On the bar 58 and at the edges of the film are cleats 66 and 67 to which spring clips 68 may be attached, as shown in Figure 2, to frictionally hold a plate 69, which will be placed against the back of the film to positively hold it against the inner end of the opening 56 in the bar 57. The upper portion of the member 43 is cut away to permit the container 45 to be placed into position from one end, and the member 44 is provided with a slot 70 to receive a projection 71 on the inner end of the container 45 to prevent the container rotating.

At the rear of the casing is a screw 72 which is held in bearings 73 and 74 and provided with a gear 75 that meshes with the gear 18, to rotate the screw as the gear 18 rotates. On the screw 72 is a nut 76 having projecting flanges 77 which engage a rod 78 to prevent the nut rotating. And it will be observed that as the screw rotates the nut 76 will move longitudinally thereof and as it engages either one of the bearings it will act as a stop and stop the movement of the entire mechanism. The pitch and length of the screw may be designed so that as the nut moves the entire length of the screw the portion of the film that is to be exposed will pass the opening behind the lens. The direction of the mechanism may then be reversed so that the screw will rotate in the opposite direction to operate the film in the opposite direction.

A motor having a single spring, as shown in Figure 2, may be provided in which case the motor casing will be provided with a lug 23 at each side so that the entire motor casing may be turned around to reverse the direction of the film. However, it is also understood that the motor may be provided with two springs, as shown in Figures 4 and 5 and each spring wound to rotate the device in opposite directions. In the design shown in Figure 4, the motor is provided with a spring 79 and another spring 80, each of which are mounted inside of gears 81 and 82. These springs are mounted on shafts 83 and 84 having beveled gears 85 and 86 at their inner ends which mesh with another beveled gear 87 on shaft 88. The upper end of the shaft 88 is provided with a thumb nut 89 having a foldable handle. And it will be observed that as the shaft 88 is rotated it will wind one spring in one direction and the other in the opposite direction. The gears 81 and 82 mesh with pinions 90 and 91 which are rotatably mounted on a shaft 92, and the shaft 92 upon which the lug 23 is mounted, is provided with a gear 93 that engages a pinion 94 to operate a governor 95 to control the speed. Each of the pinions 90 and 91 are provided with a ball clutch 96, as shown in Figure 6, to permit the shaft to rotate in one direction without rotating the pinion, so that as one spring is rotating the shaft in one direction the gear of the other spring may be held stationary by a pin 97, as shown in Figure 5. A similar pin is provided for each of the gears and the pins are held by springs 98 so that the motor may be stopped or permitted to rotate in either direction by moving the pins. The motor casing may be held to the camera by screws 99 or by any other suitable means.

It will be understood that other changes may be made in the construction without departing from the spirit of the invention. One of which changes may be in the general design or arrangement of the camera casing. Another may be in the design or arrangement of the film frame or in the means for sliding it in the casing. Another may be in the use of other means for holding the film. Another may be in the use of other means for providing the intermittent motion, and still another may be in the use of other means for operating the film.

The construction will be readily understood from the foregoing description. To use the device the film may be inserted with the roll in the container in the upper end and the lower end of the film placed through the opening in the container in the lower end. The film may then be arranged laterally so that one of the four rows of pictures will correspond with the lens and then as the film is moved the shutter will automatically be operated and a row of exposures will be made upon the film. The film may then be manually shifted and the direction reversed so that the second row of exposures may be made. This action will be repeated until the four rows of exposures are made upon the film. The film may then be readily removed and replaced.

Having thus fully described the invention what I claim as new and desire to secure by Letters Patent, is:—

1. In a device of the class described, a casing, an inner casing slidable in the said former casing, a rack on the said inner casing, a pinion rotatably mounted in the former casing meshing with the said rack and being adaptable to be rotated from the outside of the said former casing to move the said inner casing, stationary film containers in the said inner casing with openings for the film, a spring closure for one of the said openings, means for adjusting the position of the said closure, said outer casing having a recess in the front, a lens in the said recess, an opening extending from the lens to a point within the said casing, said opening and lens positioned so that a film in the containers of the inner casing will pass the said opening as it moves from one container to another and also moves transversely of the said opening, a rotatable shutter having an exposure opening therein passing through the said opening behind the lens, gears between the said shutter and film for rotating the shutter, said gears being operated from a point at the side of the said casing, a shaft extending from the said gears to the said point and having an elongated pinion thereon, a gear meshing with the said pinion, sprockets adaptable to engage openings at the sides of a film, means for rotating the said sprockets with an intermittent motion said operating means also operating the shutter gears continuously, means for stopping the movement of said film and shutter, an auxiliary casing positioned at the side of the said former casing, projections at the sides of the said auxiliary casing adaptable to extend into the said former casing to operate the mechanism therein, said auxiliary casing being reversible, a plurality of springs within the said auxiliary casing, suitable winding mechanism for the said springs, and suitable connections between the said springs to the projections at the sides of the auxiliary casing to cause the said projections to rotate in opposite directions.

2. In a cinematograph of the class described, a main casing, an inner slidable casing, film containers in the said inner casing, sprockets between the said containers adaptable to engage openings at the sides of the film to move the film, a lens, an opening from the lens to the film, means for sliding the inner casing to move the film transversely of the lens, a shutter, suitable gearing for operating the shutter, segmental gears for operating the film moving sprockets intermittently, an automatic stop for the gears when they have travelled a predetermined distance, a main shaft upon which some of the gears are mounted, said shaft extending through the wall of the casing and having a slot in the outer end, and a spring motor adaptable to be attached to the outside of the casing with a projection extending into the slot in the outer end of the main shaft, said motor being reversible to change the direction of rotation of the gearing.

3. In a device of the class described, a casing, an inner casing slidable in the said former casing, means for moving the said inner casing from the outside of the said former casing, stationary film containers in the said inner casing with openings for the film, a lens in the front of the said outer casing, an opening extending from the lens to a point within the said casing, said opening and lens positioned to cooperate with a film between the film containers and adaptable to move transversely of the said opening, a rotatable shutter passing through the said opening behind the lens, gears between the said shutter and film for rotating the shutter, a shaft extending from the said gears to the outer surface of the casing having a slot in the end thereof, sprockets adaptable to engage openings at the sides of the film, means for rotating the said sprockets with an intermittent motion, said operating means operating the shutter gears continuously, means for stopping the movement of said film and shutter, an auxiliary casing positioned at the side of the said former casing, projections at the sides of the said auxiliary casing adaptable to extend into the said former casing to operate the mechanism therein, said auxiliary casing being reversible, a plurality of springs within the said auxiliary casing, suitable winding mechanism for the said springs, and suitable connections between the said springs to the projections at the sides of the auxiliary casing to cause the said projections to rotate in opposite directions.

In testimony whereof he affixes his signature.

JOHN C. STEWART.